United States Patent
Jat

(10) Patent No.: US 11,418,993 B2
(45) Date of Patent: Aug. 16, 2022

(54) MANAGEMENT OF TELECOMMUNICATIONS NETWORK CONGESTION ON ROADWAYS

(71) Applicant: T-Mobile USA, Inc., Bellevue, WA (US)

(72) Inventor: Khrum Kashan Jat, Sammamish, WA (US)

(73) Assignee: T-Mobile USA, Inc., BellevuE, WA (US)

( * ) Notice: Subject to any disclaimer, the term of this patent is extended or adjusted under 35 U.S.C. 154(b) by 0 days.

(21) Appl. No.: 17/321,003

(22) Filed: May 14, 2021

(65) Prior Publication Data

US 2021/0352515 A1 Nov. 11, 2021

Related U.S. Application Data

(62) Division of application No. 16/869,530, filed on May 7, 2020, now Pat. No. 11,064,382.

(51) Int. Cl.
*H04W 4/02* (2018.01)
*H04W 28/02* (2009.01)
(Continued)

(52) U.S. Cl.
CPC ....... *H04W 28/0215* (2013.01); *H04W 4/024* (2018.02); *H04W 4/027* (2013.01); *H04W 4/40* (2018.02)

(58) Field of Classification Search
CPC .................................. H04W 4/02; H04W 4/40
See application file for complete search history.

(56) References Cited

U.S. PATENT DOCUMENTS 6,262,980 B1 7/2001 Leung et al.
6,526,010 B1 2/2003 Morioka et al.
(Continued)

FOREIGN PATENT DOCUMENTS

KR  20120089467 A  8/2012
KR  20150021561 A  3/2015
KR  20170076700 A  7/2017

OTHER PUBLICATIONS

European Patent Office, Extended European Search Report, EP Patent Application 21172462, dated Sep. 23, 2021, 13 pages.
(Continued)

*Primary Examiner* — Michael T Vu
(74) *Attorney, Agent, or Firm* — Perkins Coie LLP

(57) ABSTRACT

Systems and methods to understand the roadways (roads, highways, etc.) where customers are experiencing network congestion and the time of day when customer experience is degraded are disclosed. The method receives and aggregates data from a variety of sources, including customer data (e.g., speed, experience throughputs, reported coverage, etc.), network data (site coverage—RSRP/RSRQ, site capacity—users and bandwidth), maps/traffic data (speed limit), etc. to measure both vehicular congestion and network congestion on roadways. Ultimately, the method can generate an enhanced map that merges vehicular traffic congestion and network traffic congestion to present feature-added routes to a user. A user can then use the enhanced map to better plan their trip to ensure maximum network coverage during their trip.

20 Claims, 11 Drawing Sheets

(51) Int. Cl.
*H04W 4/024* (2018.01)
*H04W 4/40* (2018.01)

(56) References Cited

U.S. PATENT DOCUMENTS

| | | |
|---|---|---|
| 6,891,694 B2 | 5/2005 | Hetzler et al. |
| 6,973,312 B1 | 12/2005 | Ngan et al. |
| 7,038,993 B2 | 5/2006 | Minamino et al. |
| 7,142,874 B1 | 11/2006 | Oleniczak |
| 7,343,375 B1 | 3/2008 | Dulac |
| 7,539,111 B2 | 5/2009 | Ishida et al. |
| 7,539,919 B2 | 5/2009 | Hwang et al. |
| 7,680,495 B2 | 3/2010 | Abed et al. |
| 7,710,841 B2 | 5/2010 | Hwang et al. |
| 7,739,578 B2 | 6/2010 | Hwang et al. |
| 7,813,952 B2 | 10/2010 | Eskandari |
| 7,823,042 B2 | 10/2010 | Hwang et al. |
| 7,849,027 B2 | 12/2010 | Koran et al. |
| 7,898,921 B2 | 3/2011 | Ishida et al. |
| 7,929,459 B2 | 4/2011 | Silva et al. |
| 7,941,148 B2 | 5/2011 | Roskowski et al. |
| 7,945,837 B2 | 5/2011 | Hwang et al. |
| 7,957,993 B2 | 6/2011 | Macgregor |
| 7,966,233 B1 | 6/2011 | Khowash et al. |
| 7,987,122 B2 | 7/2011 | Bevente et al. |
| 8,060,079 B1 | 11/2011 | Goyal et al. |
| 8,060,602 B2 | 11/2011 | Singh et al. |
| 8,073,119 B2 | 12/2011 | Bevente et al. |
| 8,199,901 B2 | 6/2012 | Rani et al. |
| 8,270,979 B1 | 9/2012 | Vargantwar |
| 8,332,256 B2 | 12/2012 | Dey et al. |
| 8,429,270 B2 | 4/2013 | Singh et al. |
| 8,522,108 B2 | 8/2013 | Hwang et al. |
| 8,526,320 B2 | 9/2013 | Puthenpura et al. |
| 8,538,379 B1 | 9/2013 | Jessen et al. |
| 8,572,464 B2 | 10/2013 | Hwang et al. |
| 8,665,835 B2 | 3/2014 | Hussein et al. |
| 8,676,799 B1 | 3/2014 | Vaver |
| 8,694,018 B2 | 4/2014 | Budic et al. |
| 8,782,045 B1 | 7/2014 | Vaver |
| 8,782,216 B2 | 7/2014 | Raghavendran et al. |
| 8,861,691 B1 | 10/2014 | De et al. |
| 8,891,746 B2 | 11/2014 | Stachiw et al. |
| 8,914,372 B2 | 12/2014 | Cao et al. |
| 8,918,108 B2 | 12/2014 | Arad et al. |
| 8,918,397 B2 | 12/2014 | Cao et al. |
| 8,954,791 B2 | 2/2015 | Kataria et al. |
| 8,966,055 B2 | 2/2015 | Mittal et al. |
| 9,031,561 B2 | 5/2015 | Nuss et al. |
| 9,047,226 B2 | 6/2015 | Thomas et al. |
| 9,113,365 B2 | 8/2015 | Tang et al. |
| 9,154,550 B1 | 10/2015 | Abgrall et al. |
| 9,204,319 B2 | 12/2015 | Ouyang et al. |
| 9,226,178 B2 | 12/2015 | Tarraf et al. |
| 9,253,334 B1 | 2/2016 | Rai et al. |
| 9,264,932 B2 | 2/2016 | Chen et al. |
| 9,332,458 B2 | 5/2016 | Nuss et al. |
| 9,411,653 B2 | 8/2016 | Trammel et al. |
| 9,413,890 B2 | 8/2016 | Mccormack et al. |
| 9,424,121 B2 | 8/2016 | Kushnir et al. |
| 9,430,944 B2 * | 8/2016 | Grimm .................. H04L 67/12 |
| 9,437,081 B2 | 9/2016 | Hoffman et al. |
| 9,439,081 B1 | 9/2016 | Knebl et al. |
| 9,456,362 B2 | 9/2016 | Flanagan et al. |
| 9,479,981 B2 | 10/2016 | Dimou et al. |
| 9,491,285 B2 | 11/2016 | Vaderna et al. |
| 9,503,919 B2 | 11/2016 | Sofuoglu et al. |
| 9,563,491 B2 | 2/2017 | Scouller et al. |
| 9,628,363 B2 | 4/2017 | Singh et al. |
| 9,674,374 B1 | 6/2017 | Bolton et al. |
| 9,706,438 B1 | 7/2017 | Kadmon et al. |
| 9,712,295 B2 | 7/2017 | Park et al. |
| 9,753,477 B2 | 9/2017 | Berka et al. |
| 9,826,412 B2 | 11/2017 | Henderson et al. |
| 9,826,420 B2 | 11/2017 | Tarraf et al. |
| 9,867,080 B2 | 1/2018 | Sung et al. |
| 9,892,026 B2 | 2/2018 | Isman et al. |
| 9,894,215 B1 | 2/2018 | Bolton et al. |
| 9,924,045 B1 | 3/2018 | Guha et al. |
| 10,039,013 B2 | 7/2018 | Periyasamy et al. |
| 10,044,878 B2 | 8/2018 | Guha et al. |
| 10,050,844 B2 | 8/2018 | Flanagan et al. |
| 10,079,735 B2 | 9/2018 | Martone et al. |
| 10,091,679 B1 | 10/2018 | Munar et al. |
| 10,159,111 B2 | 12/2018 | De Pasquale et al. |
| 10,231,147 B2 | 3/2019 | Sung et al. |
| 10,555,191 B1 | 2/2020 | Jat et al. |
| 11,064,382 B1 | 7/2021 | Jat |
| 2003/0171976 A1 | 9/2003 | Farnes et al. |
| 2006/0064346 A1 | 3/2006 | Steenstra et al. |
| 2006/0167777 A1 | 7/2006 | Shkedy |
| 2007/0156673 A1 | 7/2007 | Maga et al. |
| 2010/0041408 A1 | 2/2010 | Caire et al. |
| 2012/0190380 A1 | 7/2012 | Dupray et al. |
| 2012/0244869 A1 | 9/2012 | Song et al. |
| 2012/0244898 A1 | 9/2012 | Guey et al. |
| 2013/0095872 A1 | 4/2013 | Sediq et al. |
| 2013/0229914 A1 | 9/2013 | Suerbaum |
| 2013/0331109 A1 | 12/2013 | Dhillon et al. |
| 2014/0278035 A1 * | 9/2014 | Nortrup .................. G01S 19/42 |
| | | 701/119 |
| 2016/0125456 A1 | 5/2016 | Wu et al. |
| 2016/0381580 A1 | 12/2016 | Kwan |
| 2017/0243484 A1 * | 8/2017 | Li .................. G08G 1/0145 |
| 2017/0272319 A1 | 9/2017 | Sheen et al. |
| 2018/0006957 A1 | 1/2018 | Ouyang et al. |
| 2018/0184307 A1 | 6/2018 | Periyasamy et al. |
| 2019/0141580 A1 | 5/2019 | Oktay et al. |
| 2019/0159048 A1 | 5/2019 | Feldkamp |
| 2019/0208438 A1 | 7/2019 | Yang et al. |
| 2019/0239238 A1 | 8/2019 | Calabrese et al. |
| 2020/0076520 A1 | 3/2020 | Jana et al. |
| 2020/0107255 A1 | 4/2020 | Cuevas Ramirez |
| 2020/0314683 A1 | 10/2020 | Imran et al. |
| 2020/0322814 A1 | 10/2020 | Tofighbakhsh et al. |
| 2021/0014698 A1 | 1/2021 | Meier-Hellstern et al. |
| 2021/0037394 A1 | 2/2021 | Wainer et al. |
| 2021/0037399 A1 | 2/2021 | Jat et al. |
| 2021/0049656 A1 | 2/2021 | Jat et al. |

OTHER PUBLICATIONS

Kuruvatti, Nandish P. et al. "Monitoring Vehicular User Mobility to Predict Traffic Status and Manage Radio Resources," 2017 IEEE 85th Vehicular Technology Conference (VTC Spring), IEEE, Jun. 4, 2017, 6 pages.

Shabir, Balawal et al. "Congestion Avoidance in Vehicular Networks: A Contemporary Survey," IEEE Access vol. 7, Nov. 27, 2019, 20 pages.

Ahas, R. et al. "Mobile Positioning in Space-Time Behaviour Studies: Social Positioning Method Experiments in Estonia" Cartography and Geographic Information Science vol. 34, No. 4, 2007, p. 259-273.

Bi, Suzhi et al. "Engineering Radio Maps for Wireless Resource Management" IEEE Wireless Communications, Apr. 2019, p. 133-141.

De Reuver, M. et al. "Designing viable business models for context-aware mobile services" Elsevier Telematics and Informatics 26 (2009) p. 240-248.

Lee, Seung-Cheol et al. "Efficient Mining of User Behaviors by Temporal Mobile Access Patterns" International Journal Computer Science and Network Security, vol. 7, No. 2, Feb. 2007, p. 285-291.

Ratti, C. et al. "Mobile Landscapes: using location data from cell phones for urban analysis" Environment and Planning B: Planning and Design 2006, vol. 33, p. 727-748.

Roth, John D. et al. "Efficient System Geolocation Architecture in Next-Generation Cellular Networks" IEEE Systems Journal, vol. 12, No. 4, Dec. 2018, p. 3414-3425.

(56) References Cited

OTHER PUBLICATIONS

Tseng, V.S. et al. "Mining Temporal Mobile Sequential Patterns in Location-Based Service Environments" IEEE International Conference 2007, 8 pages.

* cited by examiner

| | SITE Congestion High | SITE Congestion Medium | SITE Congewstion Low |
|---|---|---|---|
| Vehicular Congestion High | Low Customer experience | Low Customer experience | Medium Customer experience |
| Vehicular Congestion Medium | Low Customer experience | Medium Customer experience | High Customer experience |
| Vehicular Congestion Low | Low Customer experience | Medium Customer experience | High Customer experience |
| | SITE Congestion High ~90% Util | SITE Congestion Medium ~ 60% Util | SITE Congewstion Low ~20% Util |
| Vehicular Congestion High ~(1/2 posted speed) | 0.1 | 1 | 2 |
| Vehicular Congestion Medium (3/4 posted speed) | 1 | 3 | 10 |
| Vehicular Congestion Low (posted speed) | 1.5 | 4 | 15 |

Numbers represent Customer Expereince Threshoulds in Mbps

| 505a | 510a | 515a | 520a | 525a | 530a | 535a | 540a | 545a | 545b | 545c |
|---|---|---|---|---|---|---|---|---|---|---|
| IMSI | Market | Site | Urban/ Rural | Site Lat | Site Long | Sector | Sector BW | RSRP | RSRQ | Capacity Users Per 5 MHz |
| xxxxxx | Minneapolis | A | Urban | xxx | xxx | xxxxx | 40 | -103.95 | -10.05 | 15.1 |
| xxxxxx | Orlando | B | Urban | xxx | xxx | xxxxx | 45 | -117.4286 | -14.85714 | 24.4 |
| xxxxxx | Washington DC | C | Urban | xxx | xxx | xxxxx | 30 | -88.11429 | -6.928571 | 12.8 |
| xxxxxx | Virginia | D | Urban | xxx | xxx | xxxxx | 40 | -92.63636 | -8.409091 | 19.4 |
| xxxxxx | Houston | E | Urban | xxx | xxx | xxxxx | 30 | -107.625 | -13.5 | 11.5 |
| xxxxxx | New York | F | Urban | xxx | xxx | xxxxx | 35 | -108.6364 | -9.727273 | 5.9 |
| xxxxxx | Seattle | G | Rural | xxx | xxx | xxxxx | 15 | -112.0765 | -13.14286 | 6.3 |
| xxxxxx | Cleveland | H | Urban | xxx | xxx | xxxxx | 20 | -107.5 | -6.944445 | 1.8 |
| xxxxxx | Puerto Rico | I | Urban | xxx | xxx | xxxxx | 25 | -94.28571 | -10.75631 | 25.2 |
| xxxxxx | Puerto Rico | J | Urban | xxx | xxx | xxxxx | 25 | -103.3611 | -15.86111 | 13.6 |

MANAGEMENT OF TELECOMMUNICATIONS NETWORK CONGESTION ON ROADWAYS

CROSS-REFERENCE TO RELATED APPLICATIONS

This application is a divisional of U.S. patent application Ser. No. 16/869,530, filed May 7, 2020, entitled MANAGEMENT OF TELECOMMUNICATIONS NETWORK CONGESTION ON ROADWAYS, which incorporates by reference U.S. application Ser. No. 16/874,627, filed May 14, 2020, entitled IDENTIFICATION OF INDOOR AND OUTDOOR TRAFFIC USAGE OF CUSTOMERS OF A TELECOMMUNICATIONS NETWORK.

BACKGROUND

A telecommunications network is established via a complex arrangement and configuration of many cell sites that are deployed across a geographical area. For example, there can be different types of cell sites (e.g., macro cells, microcells, and so on) positioned in a specific geographical location, such as a city, neighborhood, and so on). These cell sites strive to provide adequate, reliable coverage for mobile devices (e.g., smart phones, tablets, and so on) via different frequency bands and radio networks such as a Global System for Mobile (GSM) mobile communications network, a code/time division multiple access (CDMA/TDMA) mobile communications network, a 3rd or 4th generation (3G/4G) mobile communications network (e.g., General Packet Radio Service (GPRS/EGPRS)), Enhanced Data rates for GSM Evolution (EDGE), Universal Mobile Telecommunications System (UMTS), or Long Term Evolution (LTE) network), 5G mobile communications network, IEEE 802.11 (WiFi), or other communications networks. The devices can seek access to the telecommunications network for various services provided by the network, such as services that facilitate the transmission of data over the network and/or provide content to the devices.

As device usage continues to rise at an impressive rate, there are too many people using too many network (and/or data)-hungry applications in places where the wireless edge of the telecommunications network has limited or no capacity. As a result, most telecommunications networks have to contend with issues of network congestion. Network congestion is the reduced quality of service that occurs when a network node carries more data than it can handle. Typical effects include queueing delay, packet loss or the blocking of new connections, overall resulting in degraded customer experience.

BRIEF DESCRIPTION OF THE DRAWINGS

FIG. 2B shows a matrix to determine the values of the aggregate vehicular-network congestion metric.

FIG. 5 is an example of customer data records collected by a customer data module.

Figure 1:
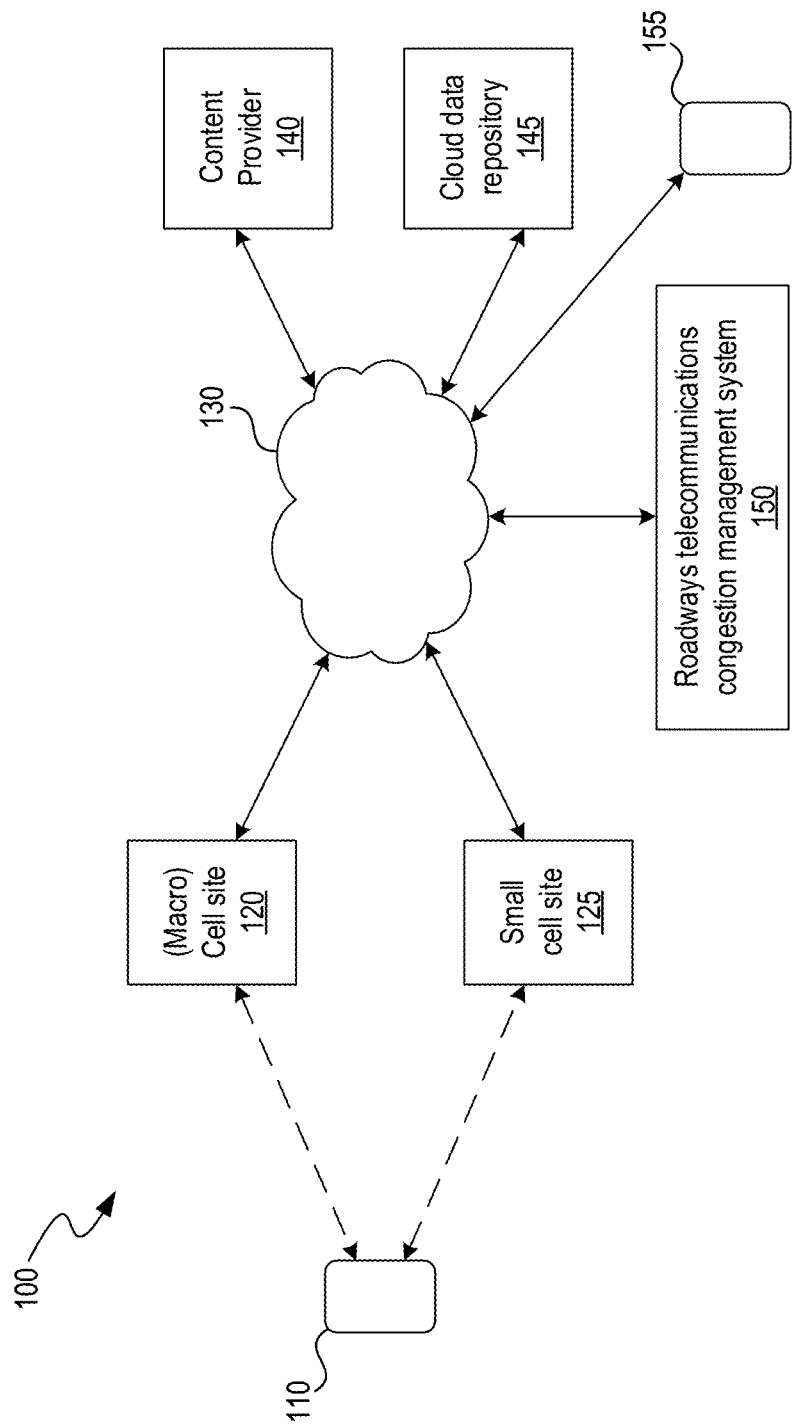
FIG. 1 is a block diagram illustrating a suitable computing environment within which to manage telecommunications network congestion on roadways.

In the drawings, some components and/or operations can be separated into different blocks or combined into a single block for discussion of some of the implementations of the present technology. Moreover, while the technology is amenable to various modifications and alternative forms, specific implementations have been shown by way of example in the drawings and are described in detail below. The intention, however, is not to limit the technology to the specific implementations described. On the contrary, the technology is intended to cover all modifications, equivalents, and alternatives falling within the scope of the technology as defined by the appended claims.

DETAILED DESCRIPTION

An aim of a telecommunications service provider is to minimize customer experience degradation. This is typically achieved by deploying congestion management and/or network improvement solutions at one or more cell sites. To combat network congestion, different capacity planning solutions have been suggested to address and resolve the degradation issues. However, current methods for improving capacity planning of telecommunications network are not sensitive to vehicular traffic patterns, and thus are not able to provide enhanced customer experience to customers as they are driving and/or planning a trip. While the term "customer" is used in the application, one of skill in the art will understand that the concepts discussed herein will similarly apply to other users, who may or may not be customers of a telecommunications service provider, and may apply to devices disassociated from users, such as to vehicles having embedded cellular communications systems.

To solve these and other problems, the inventors have developed methods to understand the roadways (roads, highways, etc.) where customers are experiencing network congestion and the time of day when customer experience is degraded ("roadways telecommunications congestion management system"). Once a telecommunications network service provider is able to understand where and when congestion happens in a city and during which time of day, the service provider will then be able to improve overall customer experience and/or identify targeted products/services offerings to customers. One of the purposes of the dominant location system is to plan for site capacity (for example, small cell planning, hot-spots planning, and dense area capacity planning) and to offer optimum/premium customer experience. The system does this by understanding the customer's experience on roadways over a certain period of time (for example, a month or a year) so that the customer's overall experience can be enhanced.

The system receives and aggregates data from a variety of sources, including customer data (e.g., speed, experience throughputs, reported coverage, etc.), network data (site coverage—RSRP/RSRQ, site capacity—users and bandwidth), maps/traffic data (speed limit), etc. to measure congestion on roadways. For instance, the system can compare a customer's speed on a roadway with the maximum roadway speed. When the customers speed is lower than a threshold amount of the roadway's speed (e.g., half of posted speed), the system can check on the quality of the customer's overall experience (e.g., average throughput <1 Mbps). If both the customers speed and overall experience are low, then the system determines whether the portion of the roadway and its associated site are congested based on certain threshold parameters. For example, for a site covering the portion of the roadway, if the site has greater than 30% of sessions below 1 Mbps and there are greater than 35 users per 5 Mhz, then the system can flag the site as a congested site covering a congested road.

If the route is congested and the site is congested, the system can recommend a solution to the congestion problem by, for example, recommending a cell split, addition of a small cell, or adding a sector to an existing cell. Cell Splitting is the process of subdividing a congested cell into smaller cells such that each smaller cell has its own base station with reduced antenna height and reduced transmitter power. It increases the capacity of a cellular system since number of times channels are reused increases. Small cells are wireless network base stations with a low radio frequency power output, footprint and range. Small cells complement macrocells to improve coverage, capacity and user experience. A machine learning model can be used to recommend the solution to the congestion problem, as described in this application.

On the other hand, when both the customer's speed and overall experience are low but the site is not congested, then the system can flag the site as a not congested site covering a congested road. Ultimately, the system can generate an enhanced map that merges vehicular traffic congestion and network traffic congestion to present feature-added routes to a user. A user can then use the enhanced map to better plan their trip to ensure maximum network coverage during their trip.

In the following description, for the purposes of explanation, numerous specific details are set forth in order to provide a thorough understanding of implementations of the present technology. It will be apparent, however, to one skilled in the art that implementations of the present technology can be practiced without some of these specific details.

The phrases "in some implementations," "according to some implementations," "in the implementations shown," "in other implementations," and the like generally mean the specific feature, structure, or characteristic following the phrase is included in at least one implementation of the present technology and can be included in more than one implementation. In addition, such phrases do not necessarily refer to the same implementations or different implementations.

Suitable Computing Environments

FIG. 1 is a block diagram illustrating a suitable computing environment within which to manage telecommunications network congestion on roadways.

One or more user devices 110, such as mobile devices or user equipment (UE) associated with users (such as mobile phones (e.g., smartphones), tablet computers, laptops, and so on), Internet of Things (IoT) devices, devices with sensors, and so on, receive and transmit data, stream content, and/or perform other communications or receive services over a telecommunications network 130, which is accessed by the user device 110 over one or more cell sites 120, 125. For example, the mobile device 110 can access a telecommunication network 130 via a cell site at a geographical location that includes the cell site, in order to transmit and receive data (e.g., stream or upload multimedia content) from various entities, such as a content provider 140, cloud data repository 145, and/or other user devices 155 on the network 130 and via the cell site 120.

The cell sites can include macro cell sites 120, such as base stations, small cell sites 125, such as picocells, microcells, or femtocells, and/or other network access component or sites. The cell cites 120, 125 can store data associated with their operations, including data associated with the number and types of connected users, data associated with the provision and/or utilization of a spectrum, radio band, frequency channel, and so on, provided by the cell sites 120, 125, and so on. The cell sites 120, 125 can monitor their use, such as the provisioning or utilization of physical resource blocks (PRBs) provided by a cell site physical layer in LTE network; likewise the cell sites can measure channel quality, such as via channel quality indicator (CQI) values, etc.

Other components provided by the telecommunications network 130 can monitor and/or measure the operations and transmission characteristics of the cell sites 120, 125 and other network access components. For example, the telecommunications network 130 can provide a network monitoring system, via a network resource controller (NRC) or network performance and monitoring controller, or other network control component, in order to measure and/or obtain the data associated with the utilization of cell sites 120, 125 when data is transmitted within a telecommunications network.

In some implementations, the computing environment 100 includes a roadways telecommunications congestion management system 150 configured to monitor aspects of the network 130 based on, for example, data received from the network monitoring system. The roadways telecommunications congestion management system 150 can receive customer usage data, roadways data (including, for example, posted speeds, vehicular traffic information, etc.), and network data to determine where and when congestion happens in a geographic area (e.g., in a city) and/or during which time(s) of day.

FIG. 1 and the discussion herein provide a brief, general description of a suitable computing environment 100 in which the roadways telecommunications congestion management system 150 can be supported and implemented. Although not required, aspects of the roadways telecommunications congestion management system 150 are described in the general context of computer-executable instructions, such as routines executed by a computer, e.g., mobile device, a server computer, or personal computer. The system can be practiced with other communications, data processing, or computer system configurations, including: Internet appliances, hand-held devices (including tablet computers and/or personal digital assistants (PDAs)), Internet of Things (IoT) devices, all manner of cellular or mobile phones, multiprocessor systems, microprocessor-based or programmable consumer electronics, set-top boxes, network PCs, minicomputers, mainframe computers, and the like. Indeed, the terms "computer," "host," and "host computer," and "mobile device" and "handset" are generally used interchangeably herein, and refer to any of the above devices and systems, as well as any data processor.

Aspects of the system can be embodied in a special purpose computing device or data processor that is specifically programmed, configured, or constructed to perform one or more of the computer-executable instructions explained in detail herein. Aspects of the system can also be practiced in distributed computing environments where tasks or modules are performed by remote processing devices, which are linked through a communications network, such as a Local Area Network (LAN), Wide Area Network (WAN), or the Internet. In a distributed computing environment, program modules can be located in both local and remote memory storage devices.

Aspects of the system can be stored or distributed on computer-readable media (e.g., physical and/or tangible non-transitory computer-readable storage media), including magnetically or optically readable computer discs, hard-wired or preprogrammed chips (e.g., EEPROM semiconductor chips), nanotechnology memory, or other data storage media. Indeed, computer implemented instructions, data structures, screen displays, and other data under aspects of the system can be distributed over the Internet or over other networks (including wireless networks), on a propagated signal on a propagation medium (e.g., an electromagnetic wave(s), a sound wave, etc.) over a period of time, or they can be provided on any analog or digital network (packet switched, circuit switched, or other scheme). Portions of the system reside on a server computer, while corresponding portions reside on a client computer such as a mobile or portable device, and thus, while certain hardware platforms are described herein, aspects of the system are equally applicable to nodes on a network. In alternative implementations, the mobile device or portable device can represent the server portion, while the server can represent the client portion.

In some implementations, the user device 110 and/or the cell sites 120, 125 can include network communication components that enable the devices to communicate with remote servers or other portable electronic devices by transmitting and receiving wireless signals using a licensed, semi-licensed, or unlicensed spectrum over communications network, such as network 130. In some cases, the communication network 130 can be comprised of multiple networks, even multiple heterogeneous networks, such as one or more border networks, voice networks, broadband networks, service provider networks, Internet Service Provider (ISP) networks, and/or Public Switched Telephone Networks (PSTNs), interconnected via gateways operable to facilitate communications between and among the various networks. The telecommunications network 130 can also include third-party communications networks such as a Global System for Mobile (GSM) mobile communications network, a code/time division multiple access (CDMA/TDMA) mobile communications network, a 3rd or 4th generation (3G/4G) mobile communications network (e.g., General Packet Radio Service (GPRS/EGPRS)), Enhanced Data rates for GSM Evolution (EDGE), Universal Mobile Telecommunications System (UMTS), or Long Term Evolution (LTE) network), 5G mobile communications network, IEEE 802.11 (WiFi), or other communications networks. Thus, the user device is configured to operate and switch among multiple frequency bands for receiving and/or transmitting data.

Further details regarding the operation and implementation of the roadways telecommunications congestion management system 150 will now be described.

Examples of Managing Telecommunications Network Congestion on Roadways

Figure 2A:
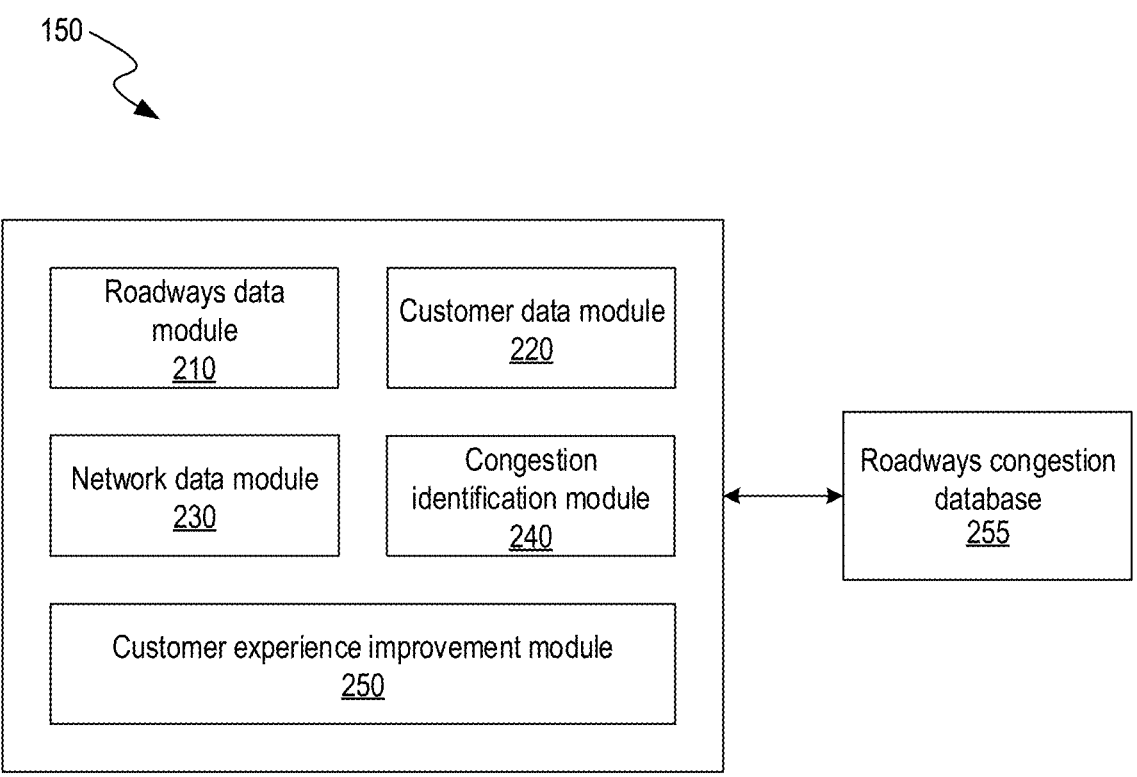
FIG. 2A is a block diagram illustrating the components of the roadways telecommunications congestion management system.

FIG. 2A is a block diagram illustrating the components of the roadways telecommunications congestion management system 150. The roadways telecommunications congestion management system 150 can include functional modules that are implemented with a combination of software (e.g., executable instructions, or computer code) and hardware (e.g., at least a memory and processor). Accordingly, as used herein, in some examples a module is a processor-implemented module or set of code, and represents a computing device having a processor that is at least temporarily configured and/or programmed by executable instructions stored in memory to perform one or more of the specific functions described herein. For example, the roadways telecommunications congestion management system 150 can include a roadways data module 210, a customer data module 220, a network data module 230, a congestion identification module 240, and a customer experience improvement module 250, each of which is discussed separately below.

Roadways Data Module

The roadways data module 210 is configured and/or programmed to receive roadways related data. For example, the roadways data module 210 collects/receives/accesses one or more of the following roadways records, such as posted speed, maximum speed, minimum speed, traffic conditions, current speed in light of traffic conditions, roadway conditions (e.g., reported/logged potholes, roadblocks, and/or other hindrances on roadway), weather conditions, construction reports, police activity, time of day, and so on. One or more roadways related data records can be associated with a timestamp to indicate that the data values correspond to the particular date/time. For example, when a roadway's maximum speed varies based on time of day (e.g., slower maximum speed during rush hour), the roadways related data can comprise two records for the same roadway: a first data record with a first timestamp (and/or time period) corresponding to a first maximum speed, and a second data record with a second timestamp (and/or time period) corresponding to a second maximum speed. The roadways data module 210 can collect/receive/access roadways related data from one or more sources, such as third-party applications (e.g., OpenStreetMaps, Google® Maps, Waze®, Here WeGo®, Inrix, MapQuest, TomTom etc.) via for example Application Programming Interfaces (APIs).

Customer Data Module

The customer data module 220 is configured and/or programmed to receive a customer's data when accessing services/utilities associated with a telecommunications network. For example, the customer data module 220 collects/receives/accesses one or more of the following customer data records associated with a customer relating to the following types of information (which can be stored in the roadways congestion database 255): location specific records (LSR), call data records (CDRs), timing advance values, RF signal data, speed, experience throughputs, reported coverage, distance between the customer and at least one telecommunications network site, strength of signal, quantity of data used, type of device of the customer, applications data (e.g., application type, name, owner, manager, data sent/received/used/saved, bandwidth used, APIs accessed, etc.), source of customer records (for example, telecommunications service provider, third-party, application owner, etc.). Examples of other types of data collected by the customer data module include, but are not limited to, data collected from third party applications (e.g., including crowdsourced data) that can help to determine customer experience with location. For example, the customer data module can collect information of a user's location using his/her social media posts (e.g., tweets, check-ins, posts, etc.). As another example, the customer data module collects application level data (e.g., collected using applications related to Internet of Things (IoT) devices, sensors, billing meters, traffic lights, etc.) to identify the user location and applications used to enhance the location algorithm. The customer data records associated with the customer can comprise information about an associated customer location and an associated timestamp. For example, a call data record for a customer can identify a customer location and a timestamp when the call was initiated. The customer data module can collect customer records that span a particular period of time depending on, for example, density of customer records, customer activity, types of customer records (for example, text, voice, video, app-usage, emergency services, etc.), services/products to be offered to the customer, types of customer experience enhancement solutions/ actions to be implemented, source of customer records, and so on. For example, as illustrated in FIG. 5, the customer data module 220 collects the following customer data: IMSI 505a, market 510a, site 515a, urban/rural indicator 520a, site location (latitude 525a and longitude 530a), sector 535a, sector bandwidth 540a, customer RF signals (e.g., RSRP 545a and RSRQ 545b), capacity users per 5 MHz 545c, and so on.

The customer data records can be used to determine a customer's vehicular speed on a portion of a roadway. For example, the customer data module can compute a customer's vehicular speed for a portion of a roadway using information contained in the customer call records. To do so, the customer data module can access the following information from customer data records: timestamp of the record and location (e.g., latitude and longitude) associated with the record. Then, for two records, each corresponding to two different locations, the customer data module can compute the customer's vehicular speed between the two different locations as follows:

$$\text{vehicular speed} = \frac{location_{data\ record2} - location_{data\ record1}}{timestamp_{data\ record2} - timestamp_{data\ record1}}$$

In some implementations, the location and timestamp information can be determined using data gathered/generated by applications on a customer's mobile device (e.g., Spotify®, Pandora®, Facebook®, Twitter®, email applications, and so on). The customer data module can then aggregate vehicular speeds of multiple customers (e.g., mean, mode, median, and so on) to compute an aggregate customer vehicular speed between the two different locations.

The Network Data Module

The network data module 230 is configured and/or programmed to receive network data, such as timing advance values, site coverage/RF signal data (e.g., Reference Signal Received Power (RSRP) data, Reference Signal Received Quality (RSRQ) data), channel quality indicator (CQI) values, capacity on site (configured bandwidth, used bandwidth, etc.), number of users, gain, lead time, and so on.

Congestion Identification Module

The congestion identification module 240 is configured and/or programmed to determine both vehicular and network congestion on a route between two locations (e.g., a starting location and a destination location). For instance, after determining whether vehicular congestion and/or telecommunications network congestion exists on a portion of a route, the congestion identification module 240 can compute an aggregate vehicular-network congestion metric value indicative of both vehicular congestion and telecommunications network congestion on that route portion.

To determine whether the roadway portion has vehicular congestion, the congestion identification module 240 can compare the individual and/or aggregate customer vehicular speed (determined by the customer data module 220) with the expected vehicular speed between two different locations (determined by the roadways data module 210) to determine whether the portion of a roadway between the two locations is congested at a particular time period (represented as, for example, a vehicular congestion metric). The expected vehicular speed can be one of the following: the posted speed, maximum speed, minimum speed, current speed, and so on. As discussed above, the expected vehicular speed can further vary based on a time of day (determined by, for example, a customer record timestamp). When the congestion identification module 240 determines that the customer's vehicular speed is lower than the expected vehicular speed by a vehicular speed threshold amount (e.g., the customer's vehicular speed is half of the expected vehicular speed), the congestion identification module identifies that the portion of the road has vehicular congestion. The vehicular speed threshold amount can be based on one or more of the following parameters: roadway location (e.g., urban, suburban, rural, etc.), time of day, special events, weather-related events (e.g., snow, rain, etc.), roadway span/length, and so on.

To determine whether the roadway portion has telecommunications network congestion, the congestion identification module 240 can assess the customers overall experience as he/she is driving on the roadway portion (represented as, for example, a network congestion metric). The customers overall experience can be assessed using one or more of the following parameters: throughput, reported coverage, lead time and so on. For example, the congestion identification module 240 compares the average customer throughput at a roadway portion with a throughput threshold amount (e.g., average throughput <1 Mbps) to assess that the quality of the customers experience is low.

When both the vehicular speed and experience of a customer are low (for example, when the vehicular congestion metric value is greater than a vehicular congestion threshold amount and the network congestion metric value is greater than a network congestion threshold amount), the congestion identification module 240 assesses site-related parameters (determined by, for example, network data module 230) to determine whether the site is congested (represented as, for example, a site congestion metric). For example, when the congestion identification module 240 assesses the site coverage and capacity to determine that the site has greater than 30% of sessions below 1 Mbps and there are greater than 35 users per 5 MHz, the site is considered to be congested. The congestion identification module 240 can consider other site-related parameters such as physical resource block (PRB) utilization, and scheduling entities/TTI (12 SE/TTI). PRB shows how much bandwidth has been used and SE/TTI shows how many users a cell site schedules in 1 msec. For example, when the PRB is above 70%, the site is considered to be congested. In another example, the higher the SE/TTI number, the more likely that the site is congested.

When the congestion identification module 240 determines that both the vehicular speed and experience of a customer are low, and the site is congested (for example, when the site congestion metric is greater than a site congestion threshold amount), then it can determine the aggregate vehicular-network congestion metric value to be congested road and congested site/network. When the congestion identification module 240 determines that both the vehicular speed and experience of a customer are low, but the site is not congested, then it can determine the aggregate vehicular-network congestion metric value to be congested road and not-congested site/network.

In some implementations, the congestion identification module 240 uses a matrix to determine the values of the aggregate vehicular-network congestion metric, shown in FIG. 2B. The matrix 260, 270 shows how the vehicular-network congestion and cell site congestion correlates to the customer experience. The matrix 270 provides numerical values 272, 274, 276 (only three labeled for brevity) for the qualitative values 262, 264, 266 (only three labeled for brevity) shown in matrix 260.

For example, when the average velocity of vehicles on the road is approximately one half of the posted speed or less, the vehicular congestion is high. When the average velocity of the vehicles is between approximately one half and three quarters of the posted speed, the vehicular congestion is medium. When the average velocity of the vehicles is greater than approximately three quarters of the posted speed, the vehicular congestion is low.

In another example, when the utilization of the cell site is approximately 90% or higher, the cell site congestion is high. When the utilization of the cell site is between approximately 90% and 60%, the site congestion is medium. When the utilization of the site is approximately 20% or less, the site congestion is low.

The vehicular congestion and the network congestion can be combined to obtain an aggregate vehicular-network congestion metric, and to predict the customer experience. The aggregate vehicular-network congestion metric can be determined using the matrix 260, 270.

For example, the aggregate vehicular-network congestion metric is high when the vehicular speed is below approximately one half of the posted speed and the cell site utilization is above approximately 60%. The aggregate vehicular-network congestion metric is also high when the cell site utilization is above approximately 90%. The aggregate vehicular-network congestion metric is medium when the vehicular speed is below approximately one half of the posted speed and the cell site utilization is below approximately 20%. The aggregate vehicular network congestion metric is also medium when the vehicular speed is above approximately one half of the posted speed and the cell site utilization is between approximately 60% and approximately 20. The aggregate vehicular-network congestion metric is low, when the vehicular speed is greater than approximately one half of the posted speed and the cell site utilization is below approximately 20%.

In some implementations, the congestion identification module 240 performs outlier analysis on the information received from the customer data module 220 and/or the network data module 230 before using that information to determine vehicular and/or network congestion metric values. In some implementations, the congestion identification module 240 can determine aggregate vehicular-network congestion metric values for multiple roadway portions (e.g., all roadways in a downtown area of a city), which can then be used to forecast future congestion on those roadway portions, similar roadway portions, and so on. For example, the information generated by congestion identification module 240 can be combined with data from other sources (such as network data, user application (e.g., Pandora®, Spotify®, etc.), speed testing applications (e.g., Ookla®), etc. to understand, learn, and forecast customer experience at a location. For example, one or more of the following data points can be used to forecast customer experience: customer handset type, throughput, RSRP, hour of the day, location (latitude/longitude), distance from sites, capacity on site, CQI, traffic per site, Physical Resource Block (PRB), bandwidth, and so on. The congestion identification module 240 can use a model (e.g., decision trees) trained on these data point values to determine a speed for a new roadway portion (for example, a roadway portion in a new city).

Customer Experience Improvement Module

The customer experience improvement module 250 is configured and/or programmed to identify at least one customer experience enhancement action. The customer experience enhancement actions are intended to enhance overall customer experience. In some implementations, the customer experience enhancement actions are identified based on a level of service subscribed to by the customer (e.g., basic service, premium service, etc.), customer's payment history, customer location, time of day, promotions, and so on. Examples of customer experience enhancement action include, but are not limited to: adding spectrum to sites, removing spectrum from sites, adding cell site proximate to the sites, removing cell site(s), displacing cell site(s), adding or enhancing at least one technology capability for a site, implementing a cell split, deploying a small cell, adding/removing a sector, enhancing sector capacity, adding/removing a cell on wheels, adding/removing a tower, adding/removing hot spots, modifying capacity at the identified at least one site, and so on. Additionally or alternatively, the customer experience enhancement action comprises providing one or more of the following services to the customer (free or at reduced rates for a period of time): gaming, home security, music, videos, advertising, offers, rebates, location intelligence, upsales, partnerships with other companies, special content. For example, based on a customer's driving route, the customer experience improvement module identifies offers for services such as, 4K video streaming services, restaurants on the route, and so on.

Figure 4A:
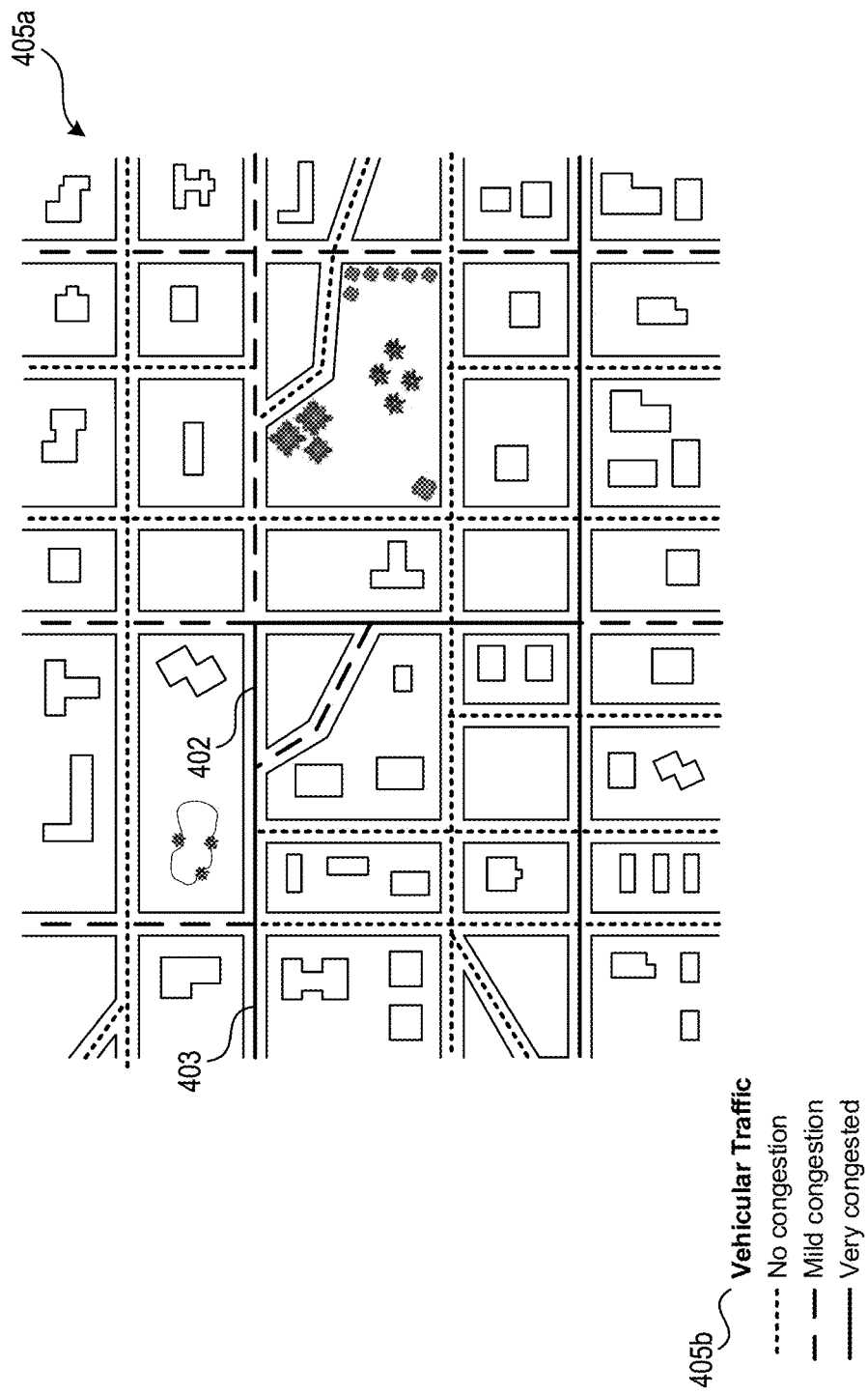
FIGS. 4A-4D are example diagrams illustrating processes (or components of processes) of managing telecommunications network congestion on roadways.
Figure 4B:
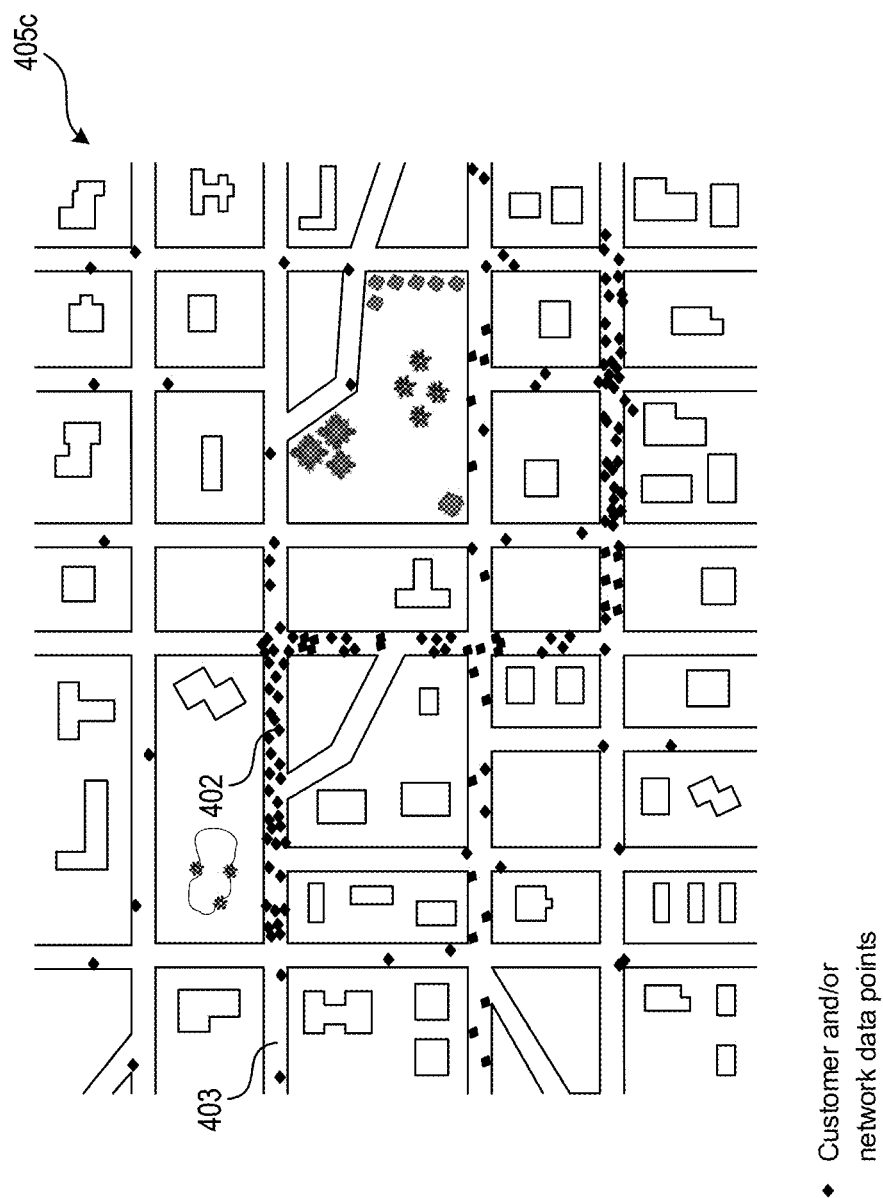
Figure 4C:
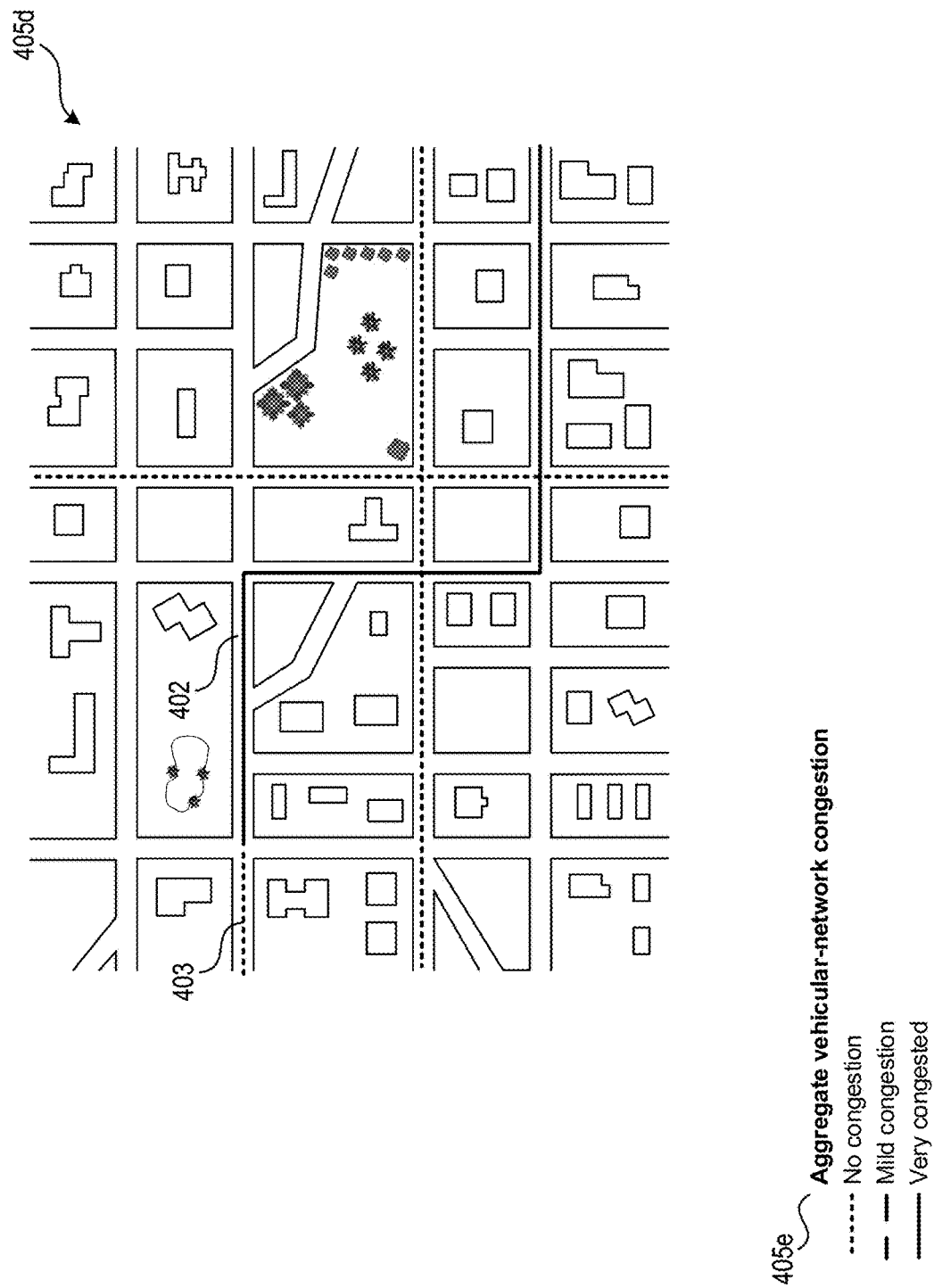

The customer experience improvement module can further present an enhanced map to customers that integrates both the vehicular traffic information and the network traffic information. For example, as illustrated in FIGS. 4A-4D, an enhanced city map can be displayed. FIG. 4A illustrates a map 405a depicting vehicular traffic (per the legend 405b) on certain roadway portions in a city. FIG. 4B illustrates a map 405c depicting customer and/or network traffic on the same roadways portions in the city, as depicted in FIG. 4A. FIG. 4C illustrates map 405d that depicts aggregate vehicular-network congestion on some of the roadways in the city, as depicted in FIGS. 4A-4B. For example, roadway portion 402, which is depicted as having high vehicular traffic in FIG. 4A ("very congested") as well as having high customer and/or network data points in FIG. 4B (and likely high site congestion), is depicted as having high aggregate vehicular-network congestion ("very congested") in FIG. 4C. A user viewing roadway portion 402 as depicted in FIG. 4C would understand that it is very congested in terms of both vehicular traffic and network traffic. As another example, roadway portion 403, which is depicted as having high vehicular traffic in FIG. 4A ("very congested") and as having low customer and/or network data points in FIG. 4B (and likely low site congestion), is depicted as having medium aggregate vehicular-network congestion ("mild congestion") in FIG. 4C.

Figure 4D:
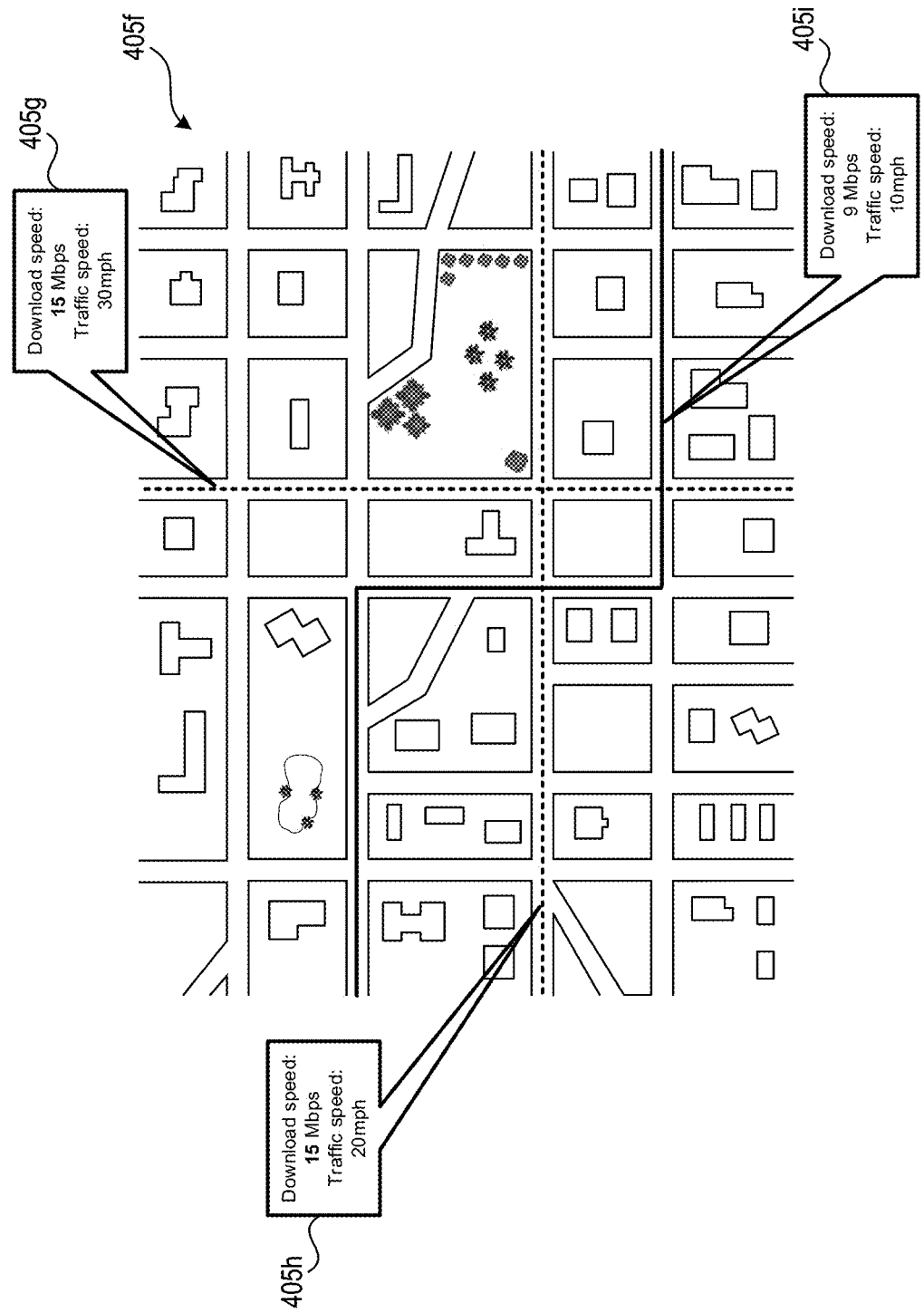

In some implementations, a customer/user can hover over portions of the route to view details of vehicular congestion, network congestion, or both. For example, FIG. 4D illustrates a map 405f that depicts aggregate vehicular-network congestion. A user can hover over various portions of the roadway and view details of the route (e.g., via 405g, 405h, and 405i).

Additionally or alternatively, the customer experience improvement module can suggest optimized/alternate routes to a customer based on the integrated vehicular and network congestion information. For example, when the congestion identification module determines both vehicular and network congestion on a route between two locations, the customer experience improvement module can suggest an alternate route with either lower vehicular congestion, lower network congestion, or both. In some implementations, the customer experience improvement module can suggest alternate routes in exchange for a fee (e.g., money, credits, watching an advertisement, tokens, and so on). The customer experience improvement module can analyze vehicular and network congestion information over a period of time (e.g., past three months) to proactively suggest an alternate route to a customer. For example, when a customer enters a destination in a route mapping/determination application (such as, enhanced Google® maps, service provider application), a value-added feature in the application (e.g., implemented as a plug-in/add-on) can suggest a route that takes into account both the vehicular and network congestion information. As another example, the customer experience improvement module can further suggest a route based on a customer's requirements during a trip. For example, the customer experience improvement module can suggest a first route to a user who desires to play videos for other travelers in his/her vehicle during a road-trip between location A and location B. And suggest a second route to a user who desires to conduct a telephone conference in his/her vehicle during a road-trip between the same location A and location B. In this example, the two different routes are suggested to enhance the type of experience desired by the customer (i.e., the first route has better video streaming capabilities and the second route is expected to have better voice call connectivity). In some implementations, the customer experience improvement module can offer enhanced services, based on the customer's trip requirements. For example, the customer experience improvement module can suggest route 1 with an expected network download speed of 10 Mbps and route 2 with an expected network download speed of 20 Mbps. The enhanced services per route can be offered for an additional fee (e.g., money, tokens, credits, watching advertisements, participating in activities, performing tasks, and so on).

The customer experience improvement module 250 can select one or more customer experience enhancement actions and rank them according to one or more of the following factors: customer preferences, cost of implementation of action, timeline of implementation of action, customer location, discount offered, and so on. In some implementations, the customer experience improvement module 250 transmits a list of selected customer experience enhancement actions to the telecommunications service provider so that one or more of the selected actions can be implemented to enhance the overall customer experience.

Flow Diagram

Figure 3:
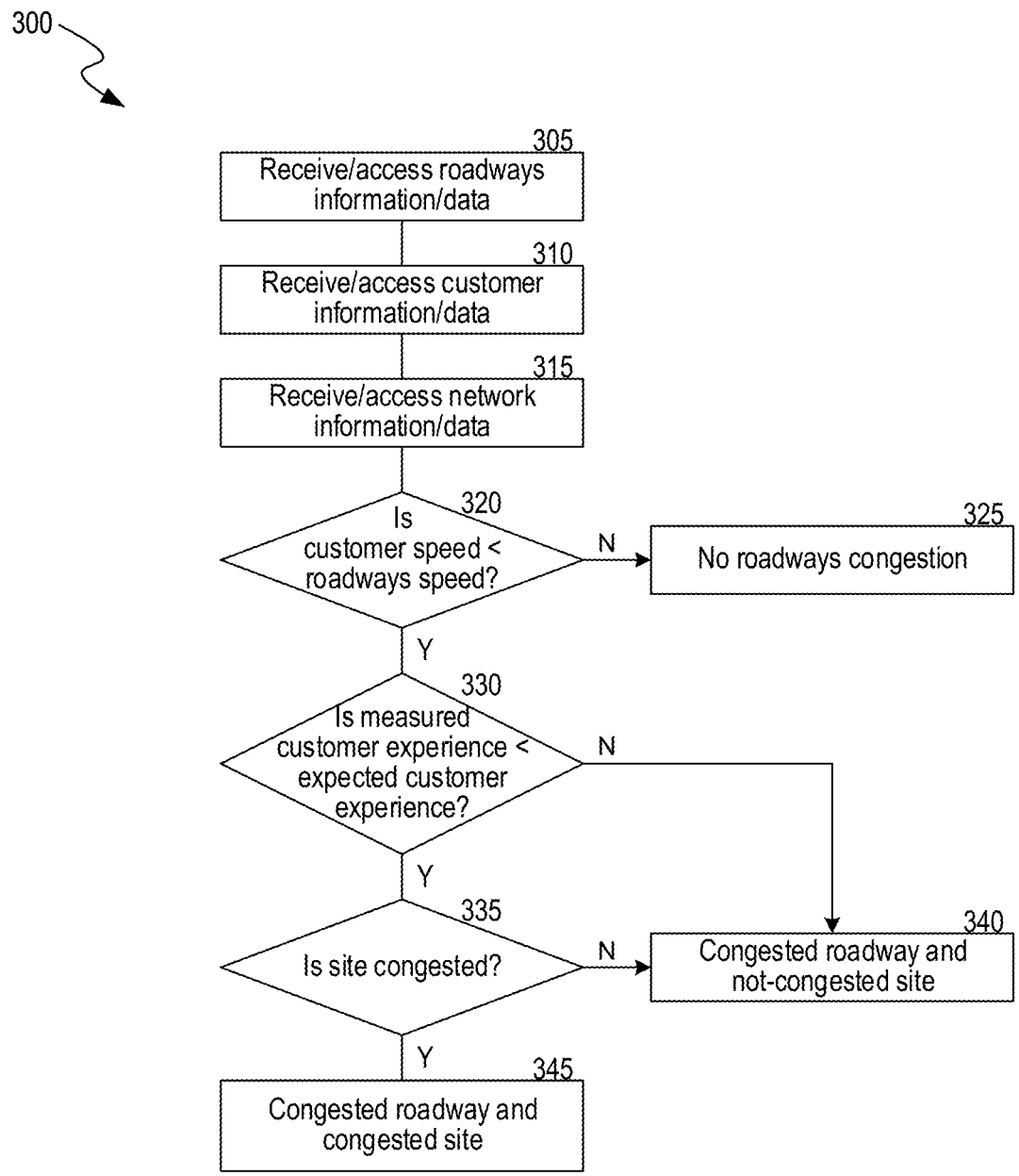
FIG. 3 is a flow diagram illustrating a process of managing telecommunications network congestion on roadways.

FIG. 3 is a flow diagram illustrating a process of identifying vehicular-network congestion on roadways to enhance a customer's experience with a telecommunications service provider. Process 300 begins at block 305 where it receives/accesses/collects a set of roadways related data records (as discussed above in reference to the roadways data module 210). At blocks 310 and 315, process 300 further receives a set of customer data records (as discussed above in reference to the customer data module 220) and a set of network data records (as discussed above in reference to the network data module 230), respectively. Process 300 then proceeds to block 320 where, after computing a customer's speed (individual and/or aggregate speed), process 300 compares the customer's speed with the expected vehicular speed for a portion of a roadway (as discussed above in reference to the congestion identification module 240). When the customer's speed is greater than the expected roadway speed (with or without considering a vehicular speed threshold amount), process 300 determines, at block 325, that no roadway congestion exists. Otherwise, when the customer's speed is less than the expected roadway speed, process 300, at block 330, determines the quality of a customer's experience. For example, process 300 compares one or more measured customer experience metric values with expected customer experience metric values.

At block 330, when process 300 determines that the customer's measured experience is less than the expected experience (with or without considering a customer experience metric threshold amount), process proceeds to block 335. At block 335, process 300 determines whether a site supporting the particular roadway portion is congested. To do so, process 300 assesses site-related parameters (determined by, for example, network data module 230) to determine whether the site is congested (represented as, for example, a site congestion metric). For example, when process 300 assesses the site coverage and capacity to determine that the site has greater than 30% of sessions below 1 Mbps and there are greater than 35 users per 5 MHz, it determines that the site is congested. When the site is determined to be congested, process 300, at block 345 determines an aggregate vehicular-network congestion metric value to be congested road and congested site/network. After block 345, process 300 can identify at least one customer experience enhancement action to enhance overall customer experience (as discussed above in reference to the customer experience improvement module 250).

Alternatively, at block 330, when process 300 determines that the customers measured experience is greater than (or equal to) the expected experience (with or without considering a customer experience metric threshold amount), process 300 proceeds to block 340 where it determines an aggregate vehicular-network congestion metric value to be congested road and not congested site/network. Similarly, at block 335, when process 300 determines that the site is not congested, process 300 proceeds to block 340.

Figure 6:
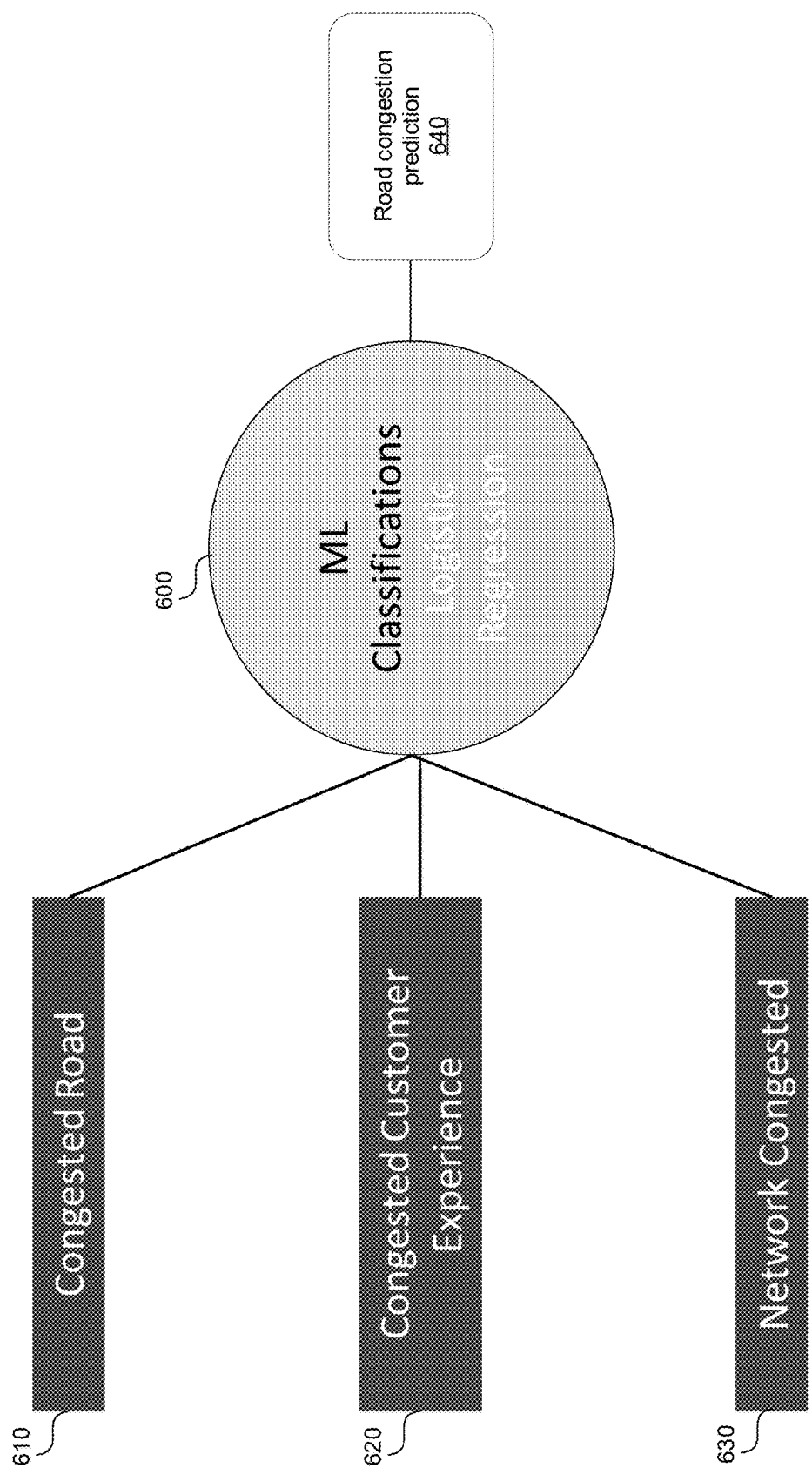
FIG. 6 shows a machine learning model trained to predict road congestion and/or aggregate vehicular-network congestion metric.

FIG. 6 shows a machine learning model trained to predict road congestion and/or aggregate vehicular-network congestion metric. The machine learning model 600 can take as inputs historical and real-time data such as road congestion 610, customer experience on the congested roads 620, and network congestion 630 for cell sites serving the congested roads. The machine learning model 600 can apply various techniques such as decision tree, naïve Bayes, logistic regression, support vector machine (SVM), to determine, based on the historical data and the real time data 610, 620, 630 future road congestion and/or aggregate vehicular-network congestion metric. The output 640 of the machine learning model 600 can include a road ID and/or cell site ID 720 in FIG. 7, and the congestion prediction such as high, medium, or low. The output 640 of the machine learning model 600 can also indicate the customer experience and/or the aggregate vehicular-network congestion metric.

Figure 7:
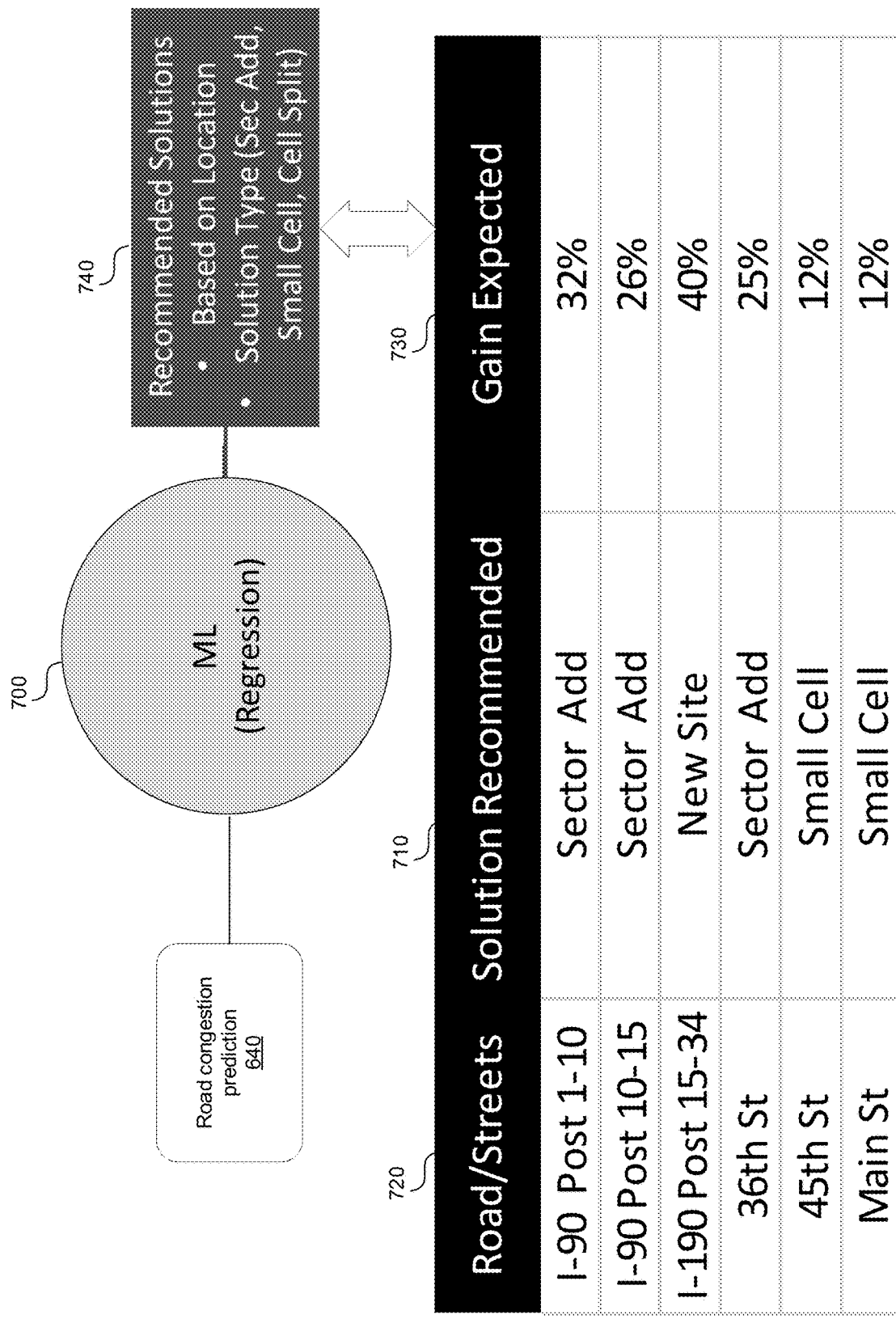
FIG. 7 shows a machine learning model trained to suggest a solution for vehicular-network congestion.

FIG. 7 shows a machine learning model trained to suggest a solution for the vehicular-network congestion. The machine learning model 700 takes as input the output 640 in FIG. 6. The machine learning model 700 is trained to suggest a solution 740 for the congested roads using historical data including solution types and capacity gains produced by the solution types. For example, the solution types shown in column 710 can include adding a new sector, adding a new site, and/or adding a small cell. The road ID and/or the cell site ID shown in column 720 show the location of the proposed solution, while the expected gain from the solution is listed in column 730.

CONCLUSION

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof, means any connection or coupling, either direct or indirect, between two or more elements; the coupling of connection between the elements can be physical, logical, or a combination thereof. Additionally, the words "herein," "above," "below," and words of similar import, when used in this application, shall refer to this application as a whole and not to any particular portions of this application. Where the context permits, words in the above Detailed Description using the singular or plural number can also include the plural or singular number respectively. The word "or," in reference to a list of two or more items, covers all of the following interpretations of the word: any of the items in the list, all of the items in the list, and any combination of the items in the list.

The above detailed description of implementations of the system is not intended to be exhaustive or to limit the system to the precise form disclosed above. While specific implementations of, and examples for, the system are described above for illustrative purposes, various equivalent modifications are possible within the scope of the system, as those skilled in the relevant art will recognize. For example, some network elements are described herein as performing certain functions. Those functions could be performed by other elements in the same or differing networks, which could reduce the number of network elements. Alternatively, or additionally, network elements performing those functions could be replaced by two or more elements to perform portions of those functions. In addition, while processes, message/data flows, or blocks are presented in a given order, alternative implementations can perform routines having blocks, or employ systems having blocks, in a different order, and some processes or blocks can be deleted, moved, added, subdivided, combined, and/or modified to provide alternative or subcombinations. Each of these processes, message/data flows, or blocks can be implemented in a variety of different ways. Also, while processes or blocks are at times shown as being performed in series, these processes or blocks can instead be performed in parallel, or can be performed at different times. Further, any specific numbers noted herein are only examples: alternative implementations can employ differing values or ranges.

The teachings of the methods and system provided herein can be applied to other systems, not necessarily the system described above. The elements, blocks and acts of the various implementations described above can be combined to provide further implementations.

Any patents and applications and other references noted above, including any that can be listed in accompanying filing papers, are incorporated herein by reference. Aspects of the technology can be modified, if necessary, to employ the systems, functions, and concepts of the various references described above to provide yet further implementations of the technology.

These and other changes can be made to the invention in light of the above Detailed Description. While the above description describes certain implementations of the technology, and describes the best mode contemplated, no matter how detailed the above appears in text, the invention can be practiced in many ways. Details of the system can vary considerably in its implementation details, while still being encompassed by the technology disclosed herein. As noted above, particular terminology used when describing certain features or aspects of the technology should not be taken to imply that the terminology is being redefined herein to be restricted to any specific characteristics, features, or aspects of the technology with which that terminology is associated. In general, the terms used in the following claims should not be construed to limit the invention to the specific implementations disclosed in the specification, unless the above Detailed Description section explicitly defines such terms. Accordingly, the actual scope of the invention encompasses not only the disclosed implementations, but also all equivalent ways of practicing or implementing the invention under the claims.

While certain aspects of the technology are presented below in certain claim forms, the inventors contemplate the various aspects of the technology in any number of claim forms. For example, while only one aspect of the invention is recited as implemented in a computer-readable medium, other aspects can likewise be implemented in a computer-readable medium. Accordingly, the inventors reserve the right to add additional claims after filing the application to pursue such additional claim forms for other aspects of the technology.

The invention claimed is:

1. A computer-implemented method for identifying network congestion to enhance a customers experience with a telecommunications service provider, the method comprising:
    receiving a selection of a first location and a second location in a geographic area;
    determining a set of driving routes between the first location and the second location; and
    for at least some driving routes in the set of driving routes:
        computing a vehicular congestion metric value for a driving route using a set of customer data records associated with customers of the telecommunications service provider;
        computing a network congestion metric value for the driving route;
        using the computed vehicular congestion metric value and the computed network congestion metric value, computing an aggregate vehicular-network congestion metric value; and
        generating an enhanced map depicting integrated vehicular congestion and network congestion at a portion of the driving route, using at least one of: the vehicular congestion metric value, the network congestion metric value, or the computed aggregate vehicular-network congestion metric value.

2. The method of claim 1, wherein the set of customer data records comprises:
    location specific records (LSR),
    call data records (CDRs),
    timing advance values,
    RF signals, distance between the customer and at least one telecommunications network site,
strength of signal received by at least one device of the customer,
quantity of data used by the at least one device of the customer,
type of the at least one device of the customer,
or any combination thereof.

3. The method of claim 1, further comprising:
computing a site congestion metric value for a telecommunication site associated the driving route using the customer data records associated with the customers of the telecommunications service provider, or a set of network data records, or both,
wherein the aggregate vehicular-network congestion metric value is further computed using the computed site congestion metric value.

4. The method of claim 1, further comprising:
receiving the set of customer data records associated with customers of the telecommunications service provider, wherein records in the set of customer data records include information about an associated customer location and an associated timestamp; and
computing an aggregate vehicular speed for the portion of the driving route between the first location and the second location using at least some of the records in the set of customer data records,
wherein the vehicular congestion metric value is computed using the computed aggregate vehicular speed and an expected speed for the portion of the driving route.

5. The method of claim 4, wherein the expected speed for the portion of the driving route is: a posted speed, a maximum speed, a minimum speed, a current speed, or any combination thereof.

6. The method of claim 1, wherein the network congestion metric value for the portion of the driving route is computed using at least some of the customer data records associated with customers of the telecommunications service provider.

7. The method of claim 1, further comprising:
generating at least one optimized route between the first location and the second location using at least one of: the vehicular congestion metric value, the network congestion metric value, or the computed aggregate vehicular-network congestion metric value.

8. The method of claim 1, further comprising:
generating at least one optimized route between the first location and the second location using at least one of: the vehicular congestion metric value, the network congestion metric value, or the computed aggregate vehicular-network congestion metric value; and
transmitting the generated at least one optimized route for presentation at a user device in exchange for a fees.

9. The method of claim 1, wherein the set of customer data records comprises data generated by one or more applications executing on a mobile device of the customer.

10. The method of claim 1, wherein computing the vehicular congestion metric value further comprises:
determining whether a computed aggregate vehicular speed is less than, greater than, or equal to a vehicular speed threshold amount of an expected speed for the portion of the driving route.

11. The method of claim 10, wherein the vehicular speed threshold amount is based on:
roadway location,
time of day,
special events,
weather-related events,
roadway length,
or any combination thereof.

12. The method of claim 1, wherein computing the network congestion metric value further comprises:
determining one or more measured metric values measuring customer experience; and
for at least some of the one or more measured metric values, determining whether the measured metric value is less than, greater than, or equal to an associated customer experience metric threshold amount of the expected metric value for the portion of the driving route.

13. The method of claim 1, wherein the aggregate vehicular-network congestion metric value is computed by:
determining that the aggregate vehicular-network congestion metric is high,
when a vehicular speed for the portion of the driving route is below approximately one half of a posted speed for the portion of the driving route and the cell site utilization is above approximately 60%, and
when the cell site utilization is above approximately 90%;
determining that the aggregate vehicular-network congestion metric is medium,
when the vehicular speed is below approximately one half of the posted speed and the cell site utilization is below approximately 20%, and
when the vehicular speed is above approximately one half of the posted speed and the cell site utilization is between approximately 60% and approximately 20%; and
determining that the aggregate vehicular-network congestion metric is low,
when the vehicular speed is greater than approximately one half of the posted speed and the cell site utilization is below approximately 20%.

14. At least one non-transitory computer-readable medium, excluding transitory signals and containing instructions, that when executed by a processor, performs a method identifying network congestion to enhance a customer's experience with a telecommunications service provider, the method comprising:
receiving a selection of a first location and a second location in a geographic area;
determining a set of driving routes between the first location and the second location; and
for at least some driving routes in the set of driving routes:
computing a vehicular congestion metric value for a driving route using a set of customer data records associated with customers of the telecommunications service provider;
computing a network congestion metric value for the driving route;
using the computed vehicular congestion metric value and the computed network congestion metric value, computing an aggregate vehicular-network congestion metric value; and
generating an enhanced map depicting integrated vehicular congestion and network congestion at a portion of the driving route, using at least one of: the vehicular congestion metric value, the network congestion metric value, or the computed aggregate vehicular-network congestion metric value.

15. The at least one computer-readable medium of claim 14, wherein the set of customer data records comprises:
  location specific records (LSR),
  call data records (CDRs),
  timing advance values,
  RF signals,
  distance between the customer and at least one telecommunications network site,
  strength of signal received by at least one device of the customer,
  quantity of data used by the at least one device of the customer,
  type of the at least one device of the customer,
  or any combination thereof.

16. The at least one computer-readable medium of claim 14, wherein the method further comprises:
  computing a site congestion metric value for a telecommunication site associated the driving route using the customer data records associated with the customers of the telecommunications service provider, or a set of network data records, or both,
    wherein the aggregate vehicular-network congestion metric value is further computed using the computed site congestion metric value.

17. The at least one computer-readable medium of claim 14, wherein the method further comprises:
  receiving the set of customer data records associated with customers of the telecommunications service provider, wherein records in the set of customer data records include information about an associated customer location and an associated timestamp; and
  computing an aggregate vehicular speed for the portion of the driving route between the first location and the second location using at least some of the records in the set of customer data records,
    wherein the vehicular congestion metric value is computed using the computed aggregate vehicular speed and an expected speed for the portion of the driving route.

18. A system for identifying vehicular-network congestion on roadways to enhance a customers experience with a telecommunications service provider, the system comprising:
  at least one hardware processor;
  at least one non-transitory memory, coupled to the at least one hardware processor and storing instructions, which when executed by the at least one hardware processor, perform a process, the process comprising:
    receiving a selection of a first location and a second location in a geographic area;
    determining a set of driving routes between the first location and the second location; and
    for at least some driving routes in the set of driving routes:
      computing a vehicular congestion metric value for a driving route using a set of customer data records associated with customers of the telecommunications service provider;
      computing a network congestion metric value for the driving route;
      using the computed vehicular congestion metric value and the computed network congestion metric value, computing an aggregate vehicular-network congestion metric value; and
      generating an enhanced map depicting integrated vehicular congestion and network congestion at a portion of the driving route, using at least one of: the vehicular congestion metric value, the network congestion metric value, or the computed aggregate vehicular-network congestion metric value.

19. The system of claim 18, wherein the set of customer data records comprises:
  location specific records (LSR),
  call data records (CDRs),
  timing advance values,
  RF signals,
  distance between the customer and at least one telecommunications network site,
  strength of signal received by at least one device of the customer,
  quantity of data used by the at least one device of the customer,
  type of the at least one device of the customer,
  or any combination thereof.

20. The system of claim 18, wherein the set of customer data records comprises data generated by one or more applications executing on a mobile device of the customer.

* * * * *